(12) United States Patent
Nakano et al.

(10) Patent No.: US 12,017,540 B2
(45) Date of Patent: Jun. 25, 2024

(54) CONTROLLER FOR AC ROTARY MACHINE AND MOTOR VEHICLE

(71) Applicant: Mitsubishi Electric Corporation, Tokyo (JP)

(72) Inventors: Kotaro Nakano, Tokyo (JP); Yoshihiko Kimpara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 414 days.

(21) Appl. No.: 17/332,310

(22) Filed: May 27, 2021

(65) Prior Publication Data
US 2022/0055486 A1    Feb. 24, 2022

(30) Foreign Application Priority Data
Aug. 18, 2020    (JP) .................. 2020-137788

(51) Int. Cl.
*B60L 15/08*    (2006.01)
*B60L 50/51*    (2019.01)

(52) U.S. Cl.
CPC ............... *B60L 15/08* (2013.01); *B60L 50/51* (2019.02); *B60L 2210/42* (2013.01);
(Continued)

(58) Field of Classification Search
CPC .......... B60L 15/08; B60L 15/20; B60L 50/51; B60L 2210/42; B60L 2220/14; B60L 2240/427; B60L 2240/525; Y02T 10/64; Y02T 10/70; Y02T 10/72; H02P 27/085; H02P 29/68
See application file for complete search history.

(56) References Cited

U.S. PATENT DOCUMENTS

2019/0280636 A1*  9/2019  Ohta ..................... H02P 6/10
2022/0029573 A1*  1/2022  Takaoka ............... H02P 27/085

FOREIGN PATENT DOCUMENTS

JP    2000134990 A  *  5/2000
JP    2006242471 A  *  9/2006
(Continued)

OTHER PUBLICATIONS

Hashemi et al.; Acoustic Noise Reduction for an Inverter-Fed Three-Phase Induction Motor; Conf. Record of the 2004 IEEE Industry Applications Conf., 2004; 39th IAS Annual Meeting; Seattle, WA; vol. 3, pp. 2030-2035 (Year: 2004).*

(Continued)

*Primary Examiner* — Michael J Zanelli
(74) *Attorney, Agent, or Firm* — Sughrue Mion, PLLC; Richard C. Turner

(57) ABSTRACT

To provide a controller for AC rotary machine and a motor vehicle which can solve the countermeasure against heat of the inverter, and the generation of sound or electric resonance, at the same time. A controller for AC rotary machine turns on and off a plurality of switching devices which the inverter has at PWM frequency, based on the n-phase voltage command values; detects the temperature of the inverter; changes the PWM frequency based on the detected temperature of the inverter; and changes the PWM frequency out of range of the avoidance frequency band, when the PWM frequency after change is within the range of the avoidance frequency band.

10 Claims, 10 Drawing Sheets

(52) U.S. Cl.
CPC ..... *B60L 2220/14* (2013.01); *B60L 2240/427* (2013.01); *B60L 2240/525* (2013.01)

(56) References Cited

FOREIGN PATENT DOCUMENTS

| | | |
|---|---|---|
| JP | 2006-311721 A | 11/2006 |
| JP | 2007-28737 A | 2/2007 |
| JP | 4123706 B2 * | 7/2008 |
| JP | 2013-133062 A | 7/2013 |
| JP | 2013133062 A * | 7/2013 |

OTHER PUBLICATIONS

Communication dated Oct. 26, 2021 from the Japanese Patent Office in Application No. 2020-137788.
Chinese Office Action dated Mar. 27, 2024 in Application No. 202110929489.0.

* cited by examiner

CONTROLLER FOR AC ROTARY MACHINE AND MOTOR VEHICLE

INCORPORATION BY REFERENCE

The disclosure of Japanese Patent Application No. 2020-137788 filed on Aug. 18, 2020 including its specification, claims and drawings, is incorporated herein by reference in its entirety.

BACKGROUND

The present disclosure relates to a controller for AC rotary machine and a motor vehicle.

The motorizing of vehicle, such as the electric vehicle and the hybrid vehicle, is advancing. The power conversion is performed by the inverter between the DC power source and the AC rotary machine. Since the AC rotary machine which drives the motor vehicle consumes large power, the heating amount of the inverter becomes large and the countermeasure against heat of the inverter becomes the important issue.

In order to solve this kind problem, for example, in JP 2013-133062 A, the AC rotary machine controller which suppresses the temperature rise of the inverter by reducing the PWM frequency is disclosed. The switching frequency of the switching device of the inverter per unit time is proportional to the PWM frequency. Therefore, when the PWM frequency is reduced, the heating amount (switching loss) per unit time due to switching of the switching device of the inverter is reduced. In the technology of JP 2013-133062 A, by reducing the PWM frequency and reducing the heating amount of switching (switching loss), the temperature rise of the inverter is suppressed.

SUMMARY

However, in the technology of JP 2013-133062 A, when reducing the PWM frequency according to the temperature of the inverter, an uncomfortable sound and noise resulting from changing the PWM frequency may be generated.

As the result of reducing the PWM frequency according to the temperature of the inverter, the PWM frequency approaches the resonance frequency determined by the electric circuit constants of the electric circuit which comprises the inverter and the DC power source, the electric resonance is generated, and the protection operation of apparatus is performed.

Then, the purpose of the present disclosure is to provide a controller for AC rotary machine and a motor vehicle which can solve the countermeasure against heat of the inverter, and the generation of sound or electric resonance, at the same time.

A controller for AC rotary machine according to the present disclosure is a controller for AC rotary machine that controls an AC rotary machine which is provided with n-phase windings (n is a natural number greater than or equal to two) via an inverter, the controller for AC rotary machine including:

a voltage command calculation unit that calculates n-phase voltage command values applied to the n-phase windings;

a PWM control unit that turns on and off a plurality of switching devices which the inverter has at a PWM frequency, based on the n-phase voltage command values;

an inverter temperature detection unit that detects a temperature of the inverter; and a PWM frequency change unit that changes the PWM frequency based on the detected temperature of the inverter, and changes the PWM frequency out of a range of an avoidance frequency band when the PWM frequency after change is within the range of the avoidance frequency band.

A motor vehicle according to the present disclosure including:

the controller for AC rotary machine, and the AC rotary machine used for a driving force source of vehicle wheels.

According to the controller for AC rotary machine and the motor vehicle of the present disclosure, by changing the PWM frequency based on the temperature of the inverter, the temperature of the inverter can be changed. Since the PWM frequency is changed out of the range of the avoidance frequency band when the PWM frequency after change is within the range of the avoidance frequency band, the avoidance frequency band can be avoided. Therefore, while avoiding the avoidance frequency band, the PWM frequency can be changed based on the temperature of the inverter, and the countermeasures against heat of the inverter, and the generation of sound or electric resonance can be solved at the same time.

DETAILED DESCRIPTION OF THE EMBODIMENTS

1. Embodiment 1

Figure 1:
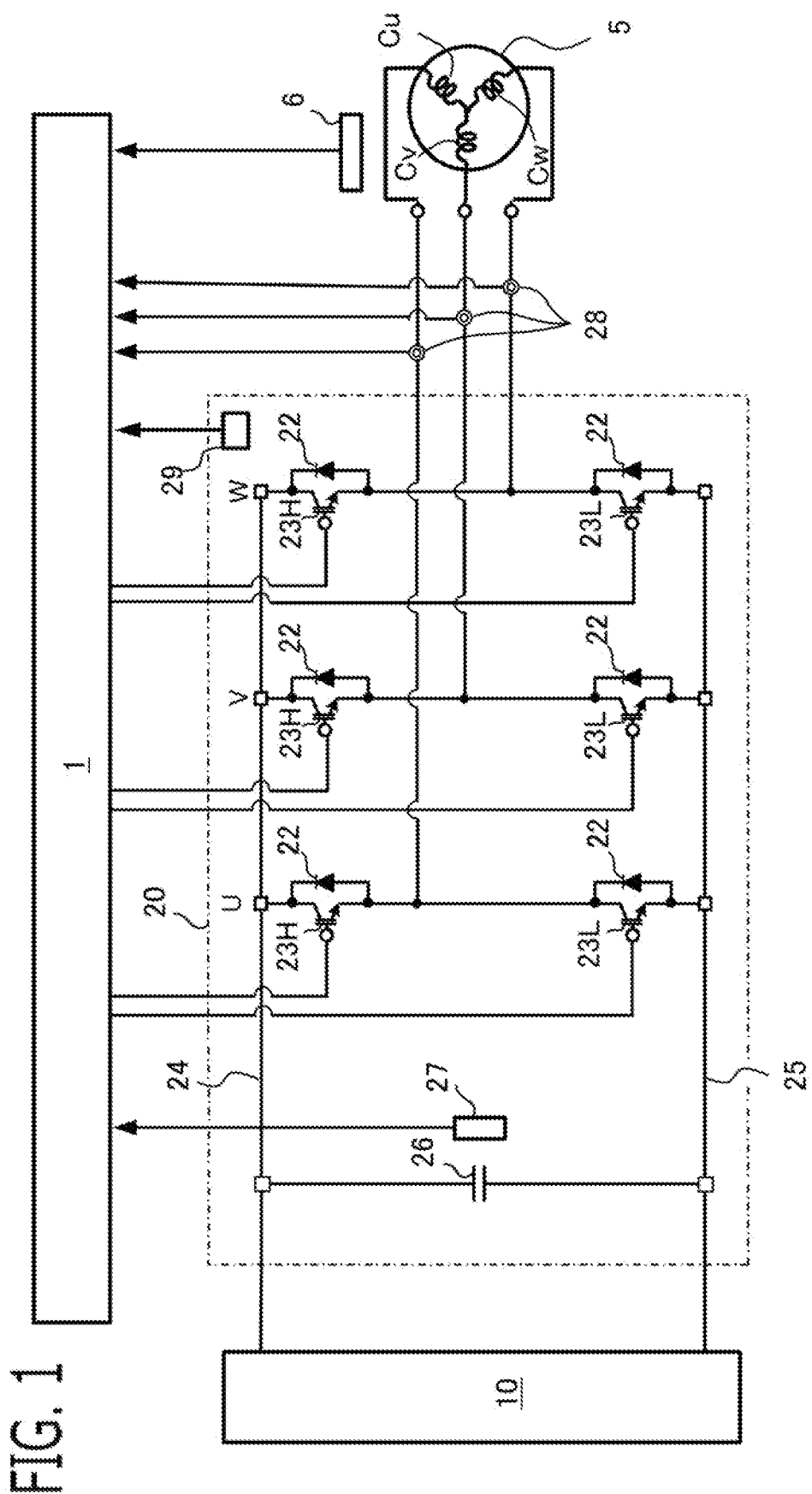
FIG. 1 is a schematic configuration diagram of the AC rotary machine and the controller for AC rotary machine according to Embodiment 1.

A controller for AC rotary machine (hereinafter, referred to simply as the controller 1) according to Embodiment 1 will be explained with reference to drawings. FIG. 1 is a schematic configuration diagram of the AC rotary machine 5 and the controller 1 according to the present embodiment.

1-1. AC Rotary Machine

The AC rotary machine 5 has a stator which has n-phase windings (n is a natural number greater than or equal to two), and a rotor. In the present embodiment, three-phase windings Cu, Cv, Cw of U phase, V phase, and W phase are provided. The three-phase windings Cu, Cv, Cw are connected by star connection. The three-phase windings may be connected by delta connection. The AC rotary machine 5 is the permanent magnet type synchronous rotary machine in which the permanent magnet is provided in the rotor. The AC rotary machine 5 may be the field winding type synchronous rotary machine in which the field winding is provided in the rotor. Alternatively, the AC rotary machine 5 may be the induction rotary machine in which the electric cage type electric conductor is provided in the rotor.

The AC rotary machine 5 is provided with a rotation sensor 6 which outputs an electric signal according to a rotational angle of the rotor. The rotation sensor 6 is a Hall element, an encoder, or a resolver. An output signal of the rotation sensor 6 is inputted into the controller 1.

1-2. Inverter

The inverter 20 is an electric power converter which performs power conversion between the DC power source 10 and the three-phase windings, and has a plurality of switching devices. The inverter 20 is provided with three sets of a series circuit (leg) where a positive electrode side switching device 23H (upper arm) connected to the positive electrode side of the DC power source 10 and a negative electrode side switching device 23L (lower arm) connected to the negative electrode side of the DC power source 10 are connected in series, corresponding to respective phase of the three-phase windings. The inverter 20 is provided with a total of six switching devices of the three positive electrode side switching devices 23H, and the three negative electrode side switching devices 23L. Then, a connection node where the positive electrode side switching device 23H and the negative electrode side switching device 23L are connected in series is connected to the winding of the corresponding phase.

Specifically, in each phase of the series circuit, the collector terminal of the positive electrode side switching device 23H is connected to the positive electrode side wire 24, the emitter terminal of the positive electrode side switching device 23H is connected to the collector terminal of the negative electrode side switching device 23L, and the emitter terminal of the negative electrode side switching device 23L is connected to the negative electrode side electric wire 25. The connection node between the positive pole side switching device 23H and the negative pole side switching device 23L is connected to the winding of the corresponding phase.

IGBT (Insulated Gate Bipolar Transistor) in which a diode 22 is connected in inverse parallel, MOSFET (Metal Oxide Semiconductor Field Effect Transistor) which has a function of diode connected in inverse parallel, or the like is used for the switching device. A gate terminal of the each switching device is connected to the controller 1. The each switching device is turned on or turned off by the control signal outputted from the controller 1.

A smoothing capacitor 26 is connected between the positive electrode side wire 24 and the negative electrode side wire 25. A voltage sensor 27 which detects a power source voltage Vdc supplied to the inverter 20 from the DC power source 10 is provided. The voltage sensor 27 is connected between the positive electrode side wire 24 and the negative electrode side wire 25. An output signal of the voltage sensor 27 is inputted into the controller 1.

The current sensor 28 outputs an electric signal according to current which flows into the winding of each phase. The current sensor 28 is provided on the each phase wire which connects the series circuit of the switching devices and the winding. An output signal of the current sensor 28 is inputted into the controller 1. The current sensor 28 may be provided in the series circuit of each phase.

The temperature sensor 29 which detects a temperature of the inverter 20 is provided. For example, the temperature sensor 29 detects a temperature of the switching device. Alternatively, the temperature sensor 29 may detect a temperature of a part of the inverter which needs to take the countermeasure against heat (for example, the cooling mechanism, the smoothing capacitor 26). A temperature of the winding or the magnet of the AC rotary machine 5 may be detected by the temperature sensor 29. A plurality of the temperature sensors 29 may be provided.

A chargeable and dischargeable electricity accumulation device (for example, a lithium ion battery, a nickel hydrogen battery, an electrical double layer capacitor) is used for the DC power source 10. A DC-DC converter which is a DC electric power converter which steps up or steps down the DC voltage may be provided in the DC power source 10.

1-3. Controller

Figure 2:
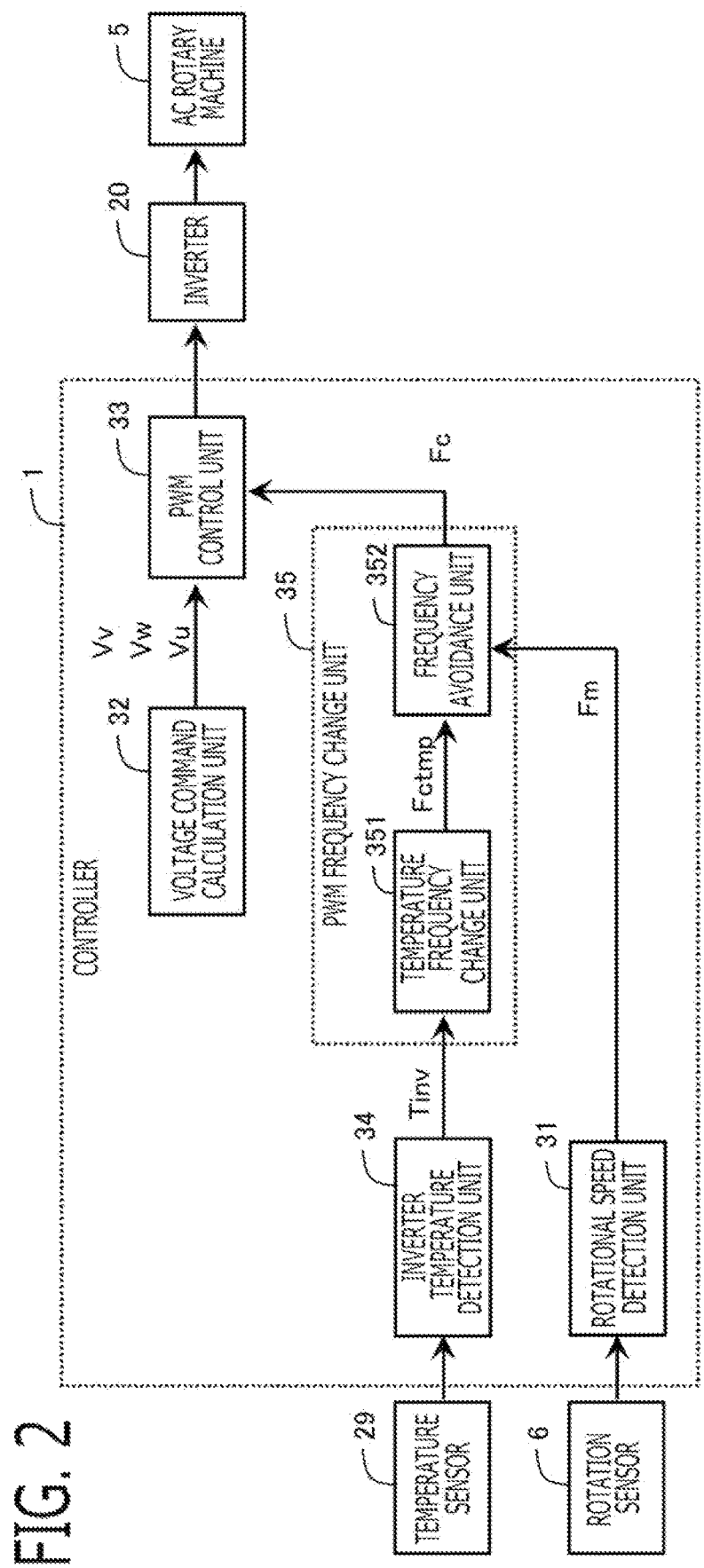
FIG. 2 is a schematic block diagram of the controller for AC rotary machine according to Embodiment 1.
Figure 3:
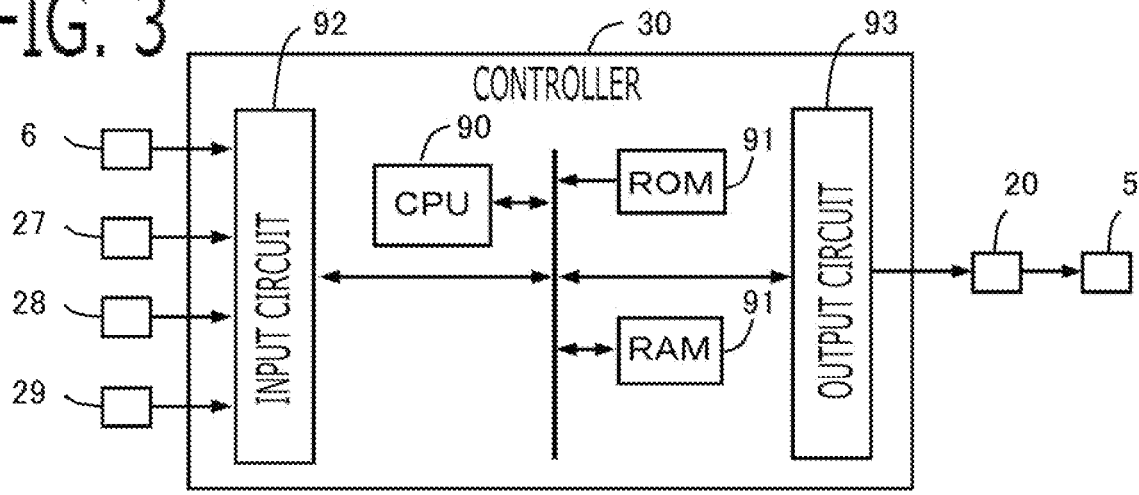
FIG. 3 is a hardware configuration diagram of the controller for AC rotary machine according to Embodiment 1.

The controller 1 controls the AC rotary machine 5 via the inverter 20. As shown in FIG. 2, the controller 1 is provided with a rotation detection unit 31, a voltage command calculation unit 32, a PWM control unit 33, an inverter temperature detection unit 34, a PWM frequency change unit 35, and the like. Each function of the controller 1 is realized by processing circuits provided in the controller 1. Specifically, as shown in FIG. 3, the controller 1 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches such as the voltage sensor 27, the current sensor 28, the temperature sensor 29, and the rotation sensor 6, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as a ROM and collaborates with other hardware devices in the controller 1, such as the storage apparatus 91, the input circuit 92, and the output circuit 93, so that the respective functions of the control units 31 to 35 of FIG. 2 provided in the controller 1 are realized. Setting data items such as an avoidance frequency band, a temperature threshold Tinv0 to be used in the control units 31 to 35 are stored, as part of software items (programs), in the storage apparatus 91 such as a ROM. Each function of the controller 1 will be described in detail below.

<Rotation Detection Unit 31>

The rotation detection unit 31 detects a magnetic pole position θ of the rotor in an electrical angle (the rotational angle θ of the rotor), a rotational angle speed ω, and a rotational frequency Fm. In the present embodiment, the rotation detection unit 31 detects the magnetic pole position θ of the rotor (the rotational angle θ), the rotational angle speed ω, and the rotational frequency Fm, based on the output signal of the rotation sensor 6. In the present embodiment, the magnetic pole position is set to a direction of the N pole of the rotor. The rotation detection unit 31 may estimate the rotational angle (the magnetic pole position) without using the rotation sensor, based on current information which are obtained by superimposing a harmonic wave component on the current command value (so-called, sensorless system).

<Voltage Command Calculation Unit 32>

The voltage command calculation unit 32 calculates the three-phase voltage command values Vu, Vv, Vw applied to the three-phase windings. The three-phase voltage command values Vu, Vv, Vw vibrate at the rotational frequency Fm of the rotor in the electrical angle. The voltage command calculation unit 32 calculates the three-phase voltage command values using well-known the vector control or the V/f control.

If the vector control is used, the voltage command calculation unit 32 calculates d-axis and q-axis current command values, based on the torque command value, the rotational angle speed ω, the power source voltage Vdc detected by the voltage sensor 27, and the like. The voltage command calculation unit 32 converts the current detection values of the three-phase windings detected by the current sensor 28 into the d-axis and q-axis current detection values, based on the magnetic pole position θ. Then, the voltage command calculation unit 32 changes d-axis and q-axis voltage command values by PI control and the like so that the d-axis and q-axis current detection values approach the d-axis and q-axis current command values. The voltage command calculation unit 32 converts the d-axis and q-axis current command values into the three-phase voltage command values Vu, Vv, Vw based on the magnetic pole position θ.

When the V/f control is used, the voltage command calculation unit 32 determines an amplitude V of the voltage command value, based on the rotational frequency command value f of the AC rotary machine. Then, the voltage command calculation unit 32 calculates the three-phase voltage command values Vu, Vv, Vw, based on the amplitude V of voltage command value, and a phase obtained by integrating with the rotational frequency command value f.

The PWM control unit 33 performs a PWM (Pulse Width Modulation) control which turns on and off the plurality of switching devices which the inverter has at a PWM frequency Fc, based on the three-phase voltage command values. In the present embodiment, the PWM control unit 33 generates switching signals which turn on and off the switching devices of each phase, by comparing each of the three-phase voltage command values and the carrier wave. The carrier wave is a triangular wave which has an amplitude of the power source voltage Vdc and vibrates at the PWM frequency Fc. The PWM control unit 33 turns on the switching signal when the voltage command value exceeds the carrier wave, and turns off the switching signal when the voltage command value falls below the carrier wave. The switching signal is transmitted as it is to the positive electrode side switching device, and a switching signal obtained by reversing the switching signal is transmitted to the negative electrode side switching device. Each switching signal is inputted into the gate terminal of each switching device of the inverter 20 via the gate drive circuit, and each switching device is turned on or turned off. The PWM control unit 33 may generate the switching signals which turn on and off the switching devices of each phase at the PWM frequency Fc by well-known the space vector PWM control, based on the three-phase voltage command values.

<Inverter Temperature Detection Unit 34>

The inverter temperature detection unit 34 detects a temperature Tinv of the inverter. The inverter temperature detection unit 34 detects the temperature Tinv of the inverter, based on the output signal of temperature sensor 29. The inverter temperature detection unit 34 detects the temperature of the switching device as the temperature Tinv of the inverter. Alternatively, the inverter temperature detection unit 34 may detect the temperature of the part of the inverter which needs to take the countermeasure against heat (for example, the cooling mechanism, the smoothing capacitor 26), as the temperature Tinv of the inverter. The inverter temperature detection unit 34 may detect the temperature of the winding or the magnet of the AC rotary machine 5, as the temperature Tinv of the inverter. The inverter temperature detection unit 34 may detect a temperature with the worst temperature state among the temperature detection values of plural points, as the temperature Tinv of the inverter. The inverter temperature detection unit 34 may use an estimation value of temperature, as the temperature Tinv of the inverter.

<PWM Frequency Change Unit 35>

The PWM frequency change unit 35 changes the PWM frequency Fc, based on the detected temperature Tinv of the inverter. The PWM frequency change unit 35 changes the PWM frequency Fc out of a range of an avoidance frequency band, when the PWM frequency after change Fc is within the range of the avoidance frequency band.

When decreasing the PWM frequency Fc, the switching frequency of the switching device decreases, the switching loss decreases, and the heating amount of the inverter decreases. According to the above configuration, by changing the PWM frequency Fc based on the temperature Tinv of the inverter, the temperature of the inverter can be changed.

On the other hand, the noise component of the PWM frequency Fc is superimposed on current. When the changed PWM frequency Fc becomes close to the mechanical resonance frequency of the AC rotary machine, or the electric resonance frequency of the inverter, the noise of the AC rotary machine increases or the component of PWM frequency Fc of current increases. Therefore, it is desirable to avoid that the PWM frequency Fc overlaps with the mechanical or electric resonance frequency. According to the above configuration, when the PWM frequency after change Fc is within the range of the avoidance frequency band, the PWM frequency Fc is changed out of the range of the avoidance frequency band. Then, the PWM frequency Fc can be set avoiding the avoidance frequency band which needs to be avoided. Therefore, while avoiding the avoidance frequency band, the PWM frequency Fc can be changed based on the temperature of the inverter, and the countermeasure against heat of the inverter, and the hearing feeling or the electric resonance can be solved at the same time.

In the present embodiment, the PWM frequency change unit 35 is provided with a temperature frequency change unit 351 and a frequency avoidance unit 352.

The temperature frequency change unit 351 changes the PWM frequency of temperature setting Fctmp based on the detected temperature Tinv of the inverter. When the temperature Tinv of the inverter exceeds a temperature threshold Tinv0, the temperature frequency change unit 351 decreases the PWM frequency of temperature setting Fctmp gradually. When the temperature Tinv of the inverter is less than the temperature threshold Tinv0, the temperature frequency change unit 351 increases the PWM frequency of temperature setting Fctmp gradually.

According to this configuration, when the temperature Tinv of the inverter exceeds the temperature threshold Tinv0, by decreasing the PWM frequency of temperature setting Fctmp gradually, the switching loss can be reduced and the temperature of the inverter can be reduced.

The temperature threshold Tinv0 is preliminarily set for reducing influence on the apparatus due to temperature rise of the inverter. For example, the temperature threshold Tinv0 is set by the CAE analysis, the test result with actual machine, or the like.

The temperature frequency change unit 351 upper-limits the PWM frequency of temperature setting Fctmp by an upper limit frequency Fcmax, and lower-limits the PWM frequency of temperature setting Fctmp by a lower limit frequency Fcmin. According to this constitution, the PWM frequency of temperature setting Fctmp can be upper and lower limited within the appropriate range.

When the PWM frequency of temperature setting Fctmp is within the range of the avoidance frequency band, the frequency avoidance unit 352 sets the PWM frequency Fc to outside the range of the avoidance frequency band; and when the PWM frequency of temperature setting Fctmp is outside the range of the avoidance frequency band, the frequency avoidance unit 352 sets the PWM frequency Fc to the PWM frequency of temperature setting Fctmp.

According to this configuration, the change processing of the PWM frequency of temperature setting Fctmp based on the temperature Tinv of the inverter can be independently operated from the avoidance processing of the avoidance frequency band; even during avoidance of the avoidance frequency band, the PWM frequency of temperature setting Fctmp can be changed based on the temperature Tinv of the inverter; and the temperature control of the inverter can be continued.

When the PWM frequency of temperature setting Fctmp is within the range of the avoidance frequency band, the frequency avoidance unit 352 changes the PWM frequency of temperature setting Fctmp to a side lower than the avoidance frequency band.

According to this configuration, since the PWM frequency Fc is changed to the side where the temperature of the inverter drops, the temperature of the inverter can be prevented from rising in order to avoid the avoidance frequency band.

<Flowchart>

Figure 4:
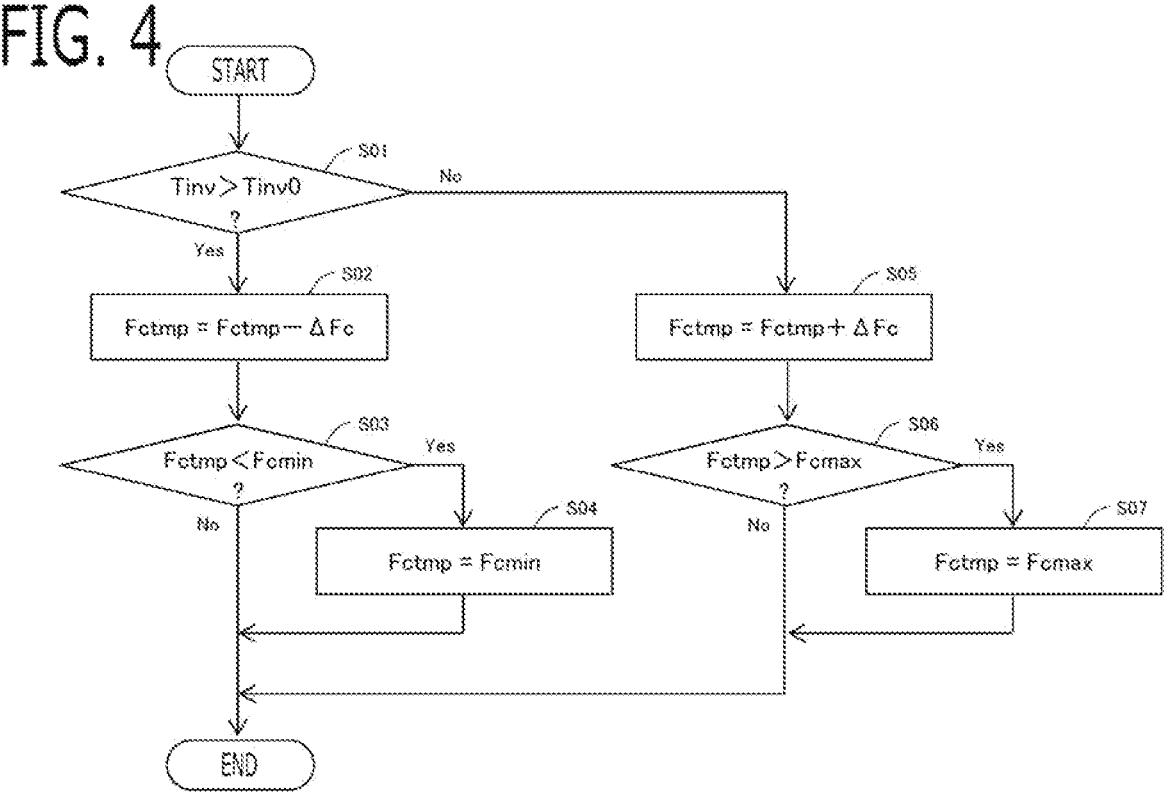
FIG. 4 is a flowchart explaining processing of the temperature frequency change unit according to Embodiment 1.
Figure 5:
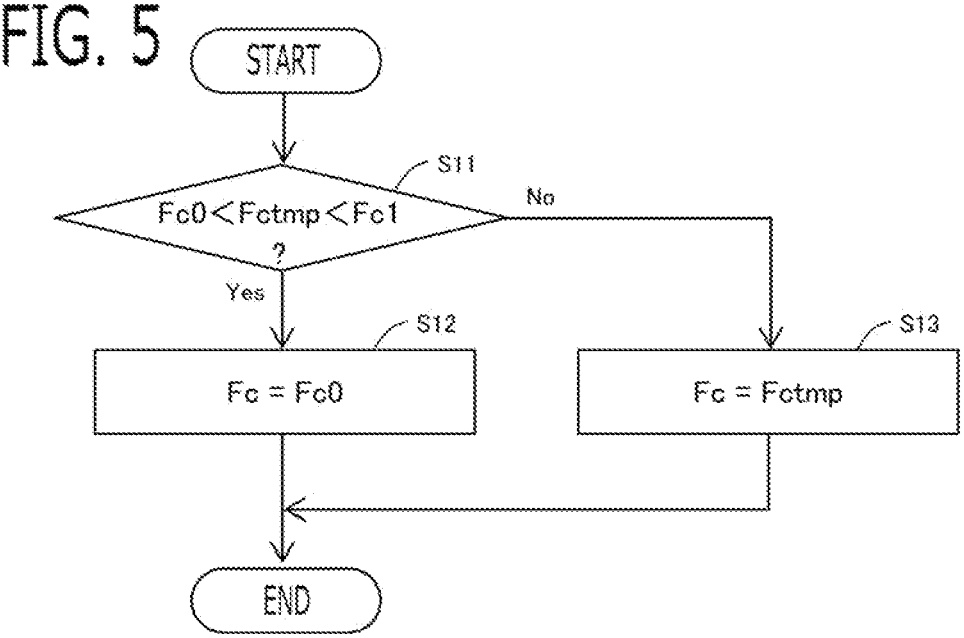
FIG. 5 is a flowchart explaining processing of the frequency avoidance unit according to Embodiment 1.

For example, the processing of the temperature frequency change unit 351 is realized by processing of the flowchart of FIG. 4, and the processing of the frequency avoidance unit 352 is realized by processing of the flowchart of FIG. 5. Processing of FIG. 4 and FIG. 5 is repeatedly performed at a predetermined calculation cycle.

Processing of FIG. 4 will be explained. In the step S01, the temperature frequency change unit 351 determines whether or not the temperature Tinv of the inverter exceeds the temperature threshold Tinv0, advances to the step S02 when exceeding, and advances to the step S05 when not exceeding.

In the step S02, the temperature frequency change unit 351 decreases the PWM frequency of temperature setting Fctmp by a preliminarily set frequency change width $\Delta$Fc. Then, in the step S03, the temperature frequency change unit 351 determines whether or not the PWM frequency of temperature setting Fctmp is less than the lower limit frequency Fcmin, advances to the step S04 when it is less, and ends processing when it is not less. In the step S04, the temperature frequency change unit 351 sets the PWM frequency of temperature setting Fctmp to the lower limit frequency Fcmin, and after lower-limiting, ends processing.

On the other hand, in the step S05, the temperature frequency change unit 351 increases the PWM frequency of temperature setting Fctmp by the frequency change width $\Delta$Fc. Then, in the step S06, the temperature frequency change unit 351 determines whether or not the PWM frequency of temperature setting Fctmp exceeds the upper limit frequency Fcmax, advances to the step S07 when exceeding, and ends the processing when not exceeding. In the step S07, the temperature frequency change unit 351 sets the PWM frequency of temperature setting Fctmp to the upper limit frequency Fcmax, and after upper-limiting, ends processing.

Next, processing of FIG. 5 will be explained. In the step S11, the frequency avoidance unit 352 determines whether or not the PWM frequency of temperature setting Fctmp is within the range of the avoidance frequency bands from a lower end frequency Fc0 to an upper end frequency Fc1, advances to the step S12 when it is within the range, and advances to the step S13 when it is outside the range.

The avoidance frequency band (from the lower end frequency Fc0 to the upper end frequency Fc1) is preliminarily set by the CAE analysis or the actual machine evaluation. Specifically, a frequency at which uncomfortable sound or noise resulting from the PWM frequency is generated, or a resonance frequency decided by the constants of the electric circuit which comprises the inverter and the DC power source is specified using the CAE analysis or the actual machine evaluation; a band for avoiding the sound or the electric resonance resulting from the setting value of PWM frequency is defined; and the lower end frequency of the defined band is set to Fc0, and the upper end frequency of the defined band is set to Fc1.

In the step S12, the frequency avoidance unit 352 sets the PWM frequency Fc to the lower end frequency Fc0 of the avoidance frequency band, and ends processing. On the other hand, in the step S13, the frequency avoidance unit 352 sets the PWM frequency Fc to the PWM frequency of temperature setting Fctmp, and ends processing.

<Control Behavior>

Figure 6:
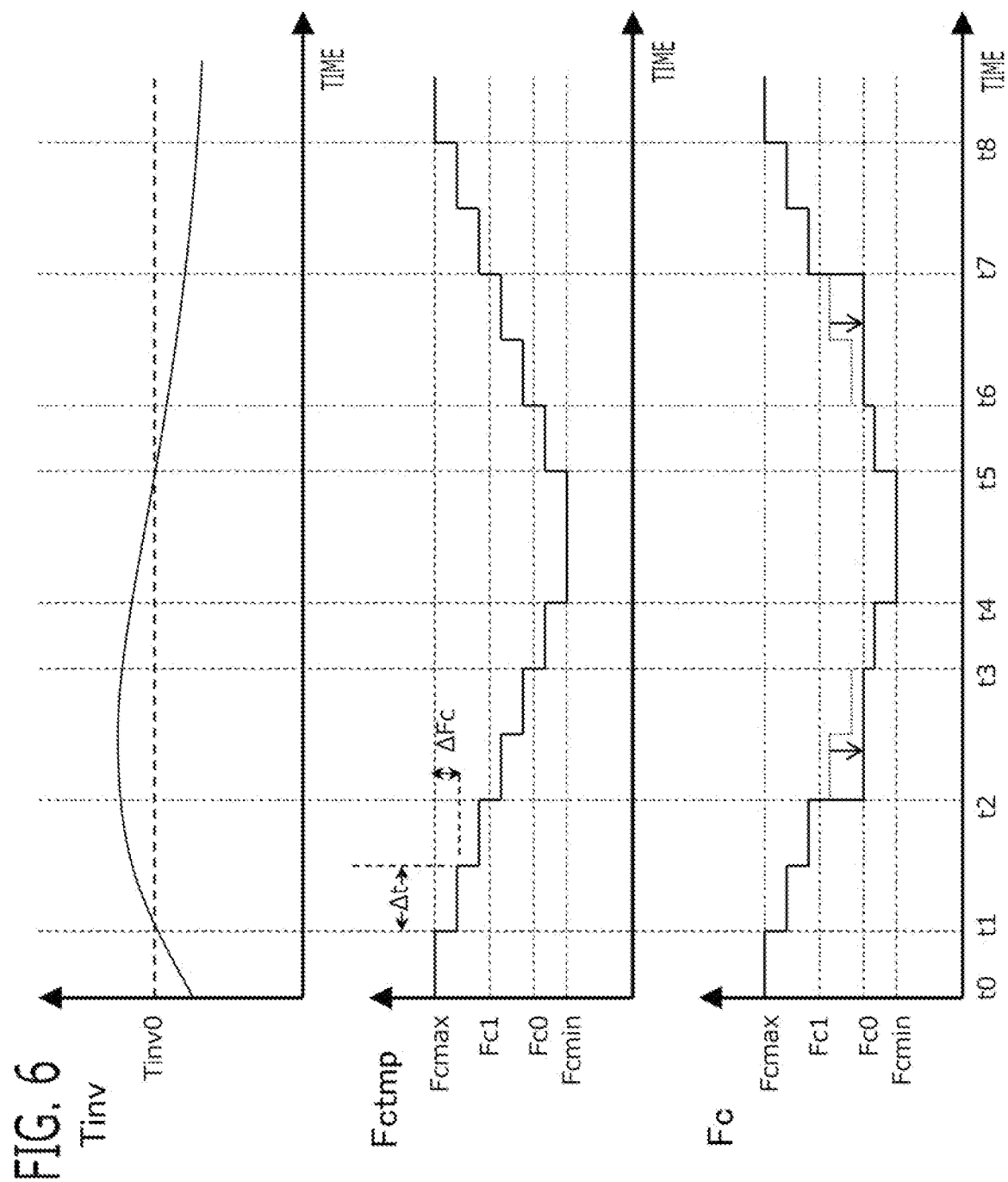
FIG. 6 is a time chart for explaining a control behavior according to Embodiment 1.

An example of the control behavior is shown in the time chart of FIG. 6. At the time t0, the temperature Tinv of the inverter is less than the temperature threshold Tinv0, the PWM frequency of temperature setting Fctmp and the PWM frequency Fc are set to the upper limit frequency Fcmax.

When the current of the inverter 20 becomes large, the temperature Tinv of the inverter rises, and the temperature Tinv of the inverter exceeds the temperature threshold Tinv0 at the time t1. Since the temperature Tinv of the inverter exceeds the temperature threshold Tinv0 from the time t1 to the time t5, the temperature frequency change unit 351 decreases the PWM frequency of temperature setting Fctmp by the frequency change width $\Delta$Fc at every calculation cycle $\Delta$t. However, from the time t4 to the time t5, since PWM frequency of temperature setting Fctmp after decrease is less than the lower limit frequency Fcmin, the temperature frequency change unit 351 set the PWM frequency of temperature setting Fctmp to the lower limit frequency Fcmin, and is lower-limiting it.

From the time t1 to the time t2, since the PWM frequency of temperature setting Fctmp calculated by the temperature frequency change unit 351 is on the side higher than the avoidance frequency band from the lower end frequency Fc0 to the upper end frequency Fc1, the frequency avoidance unit 352 sets the PWM frequency Fc to the PWM frequency of temperature setting Fctmp. However, from the time t2 to the time t3, since the PWM frequency of temperature setting Fctmp which is decreasing became within the range of the avoidance frequency band from the lower end frequency Fc0 to the upper end frequency Fc1, the frequency avoidance unit 352 sets the PWM frequency Fc to the lower end frequency Fc0 of the avoidance frequency band.

In this way, since the PWM frequency Fc is changed to the side lower than the avoidance frequency band, that is, the side where the temperature of the inverter drops, when the PWM frequency of temperature setting Fctmp is within the range of the avoidance frequency band, the temperature of the inverter can be prevented from rising in order to avoid the avoidance frequency band. Even during this avoidance from the time t2 to the time t3, the PWM frequency of temperature setting Fctmp is changed based on the temperature Tinv of the inverter, and it can be operated independently from the avoidance processing. By decreasing the PWM frequency Fc gradually, the switching loss decreases, and the temperature Tinv of the inverter is suppressed from rising and is decreasing gradually.

From the time t3 to the time t6, since the PWM frequency of temperature setting Fctmp which is decreasing became the side lower than the avoidance frequency band from the lower end frequency Fc0 to the upper end frequency Fc1, the frequency avoidance unit 352 sets the PWM frequency Fc to the PWM frequency of temperature setting Fctmp.

Since the temperature Tinv of the inverter was less than the temperature threshold Tinv0 by decrease of the current of the inverter 20 and the like after the time t5, the temperature frequency change unit 351 increases the PWM frequency of temperature setting Fctmp by the frequency change width ΔFc at every calculation cycle Δt. After the time t8, since the PWM frequency of temperature setting Fctmp after increase exceeds the upper limit frequency Fcmax, the temperature frequency change unit 351 sets the PWM frequency of temperature setting Fctmp to the upper limit frequency Fcmax, and upper-limiting.

From the time t6 to the time t7, since the PWM frequency of temperature setting Fctmp which is increasing became within the range of the avoidance frequency band from the lower end frequency Fc0 to the upper end frequency Fc1, the frequency avoidance unit 352 sets the PWM frequency Fc to the lower end frequency Fc0 of the avoidance frequency band. After the time t7, since the PWM frequency of temperature setting Fctmp which is increasing became the side higher than the avoidance frequency band from the lower end frequency Fc0 to the upper end frequency Fc1, the frequency avoidance unit 352 sets the PWM frequency Fc to the PWM frequency of temperature setting Fctmp.

In this way, while avoiding the avoidance frequency band, the PWM frequency Fc could be changed based on the temperature of the inverter, and problems such as the countermeasure against heat of the inverter, and the hearing feeling or the electric resonance can be solved at the same time.

The temperature frequency change unit 351 and the frequency avoidance unit 352 may be combined to one; the PWM frequency Fc is changed based on the temperature Tinv of the inverter; when the PWM frequency Fc is decreased, and the PWM frequency Fc is within the range of the avoidance frequency band, the PWM frequency change unit 35 may change the PWM frequency Fc to the lower side than the avoidance frequency band while jumping over the avoidance frequency band; and when the PWM frequency Fc is increased, and the PWM frequency Fc becomes within the range of the avoidance frequency band, the PWM frequency change unit 35 may change the PWM frequency Fc to the upper side than the avoidance frequency band while jumping over the avoidance frequency band.

2. Embodiment 2

Next, the AC rotary machine 5 and the controller 1 according to Embodiment 2 will be explained. The explanation for constituent parts the same as those in Embodiment 1 will be omitted. The basic configuration of the AC rotary machine 5 and the controller 1 according to the present embodiment is the same as that of Embodiment 1. However, Embodiment 2 is different from Embodiment 1 in setting of the avoidance frequency band and the avoidance processing.

Similar to Embodiment 1, the temperature frequency change unit 351 changes the PWM frequency of temperature setting Fctmp based on the detected temperature Tinv of the inverter.

<Derivation of a Plurality of Avoidance Frequency Bands>

Figure 7:
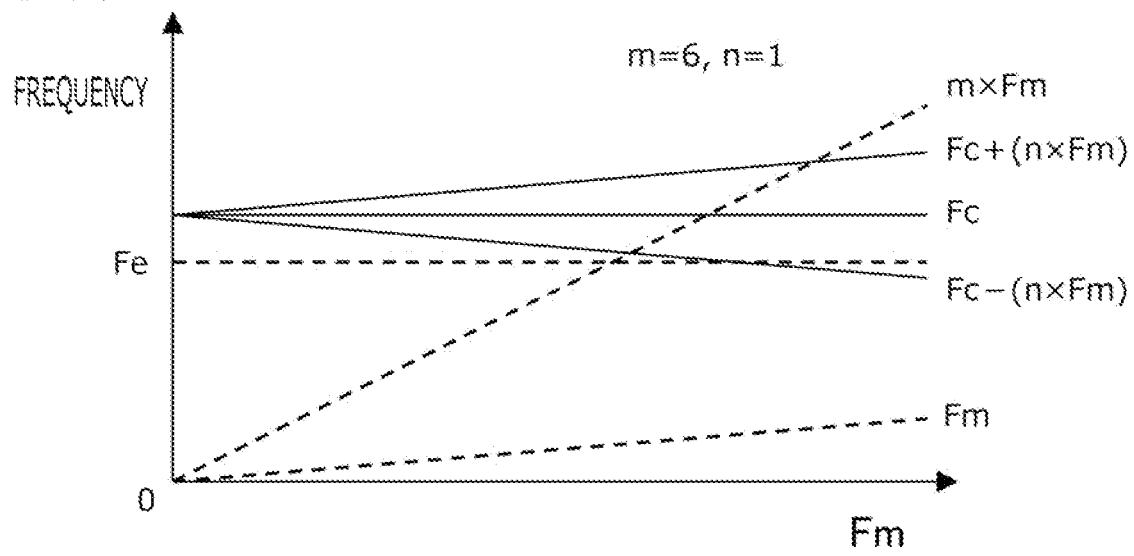
FIG. 7 is a figure explaining each frequency according to Embodiment 2.

FIG. 7 shows the relationship between the rotational frequency Fm of the AC rotary machine, and each frequency. In FIG. 7, the mechanical or electric resonance frequency Fe similar to Embodiment 1 is shown by the broken line. The resonance frequency Fe does not change according to the rotational frequency Fm of the AC rotary machine. A plurality of resonance frequency Fe may be considered.

In FIG. 7, the rotational frequency Fm of the AC rotary machine is shown by the broken line. The rotational frequency Fm of the AC rotary machine is the rotational frequency in the electrical angle. m×Fm shown by the dashed line is a harmonic frequency which is m times (in this example, m=6) of the rotational frequency Fm of the AC rotary machine. Inside of the AC rotary machine 5, the harmonic wave which is called the spatial harmonic and which is distributed spatially exists. This spatial harmonic has a high order cycle proportional to the cycle of the fundamental wave. The proportionality coefficient m is determined according to the pole number and the slot number of the AC rotary machine 5. If the component of harmonic frequency is included in current, the generation of sound of the AC rotary machine increases. Although the case of m=6 is shown in FIG. 7, the value of m may be a value other than 6 according to the structure and characteristics of the AC rotary machine 5, and a plurality of harmonic frequencies m×Fm may be considered about plural values of m.

In FIG. 7, the PWM frequency Fc is shown by the solid line. Fc+(n×Fm) shown by the solid line is a sideband on the upper side of the PWM frequency Fc, and Fc−(n×Fm) shown by the solid line is a sideband on the lower side of the PWM frequency Fc. These sidebands are harmonic wave components other than the PWM frequency Fc which are generated on current when the PWM control is performed at the PWM frequency Fc based on the three-phase voltage command values. It is known that since the three-phase voltage command values vibrate at the rotational frequency Fm, the upper and lower sidebands appear as the Fc+(n×Fm) and Fc−(n×Fm). Although FIG. 7 shows the case of n=1, the value of n may be a value other than 1, and a plurality of the upper and lower sidebands may be considered about plural values of n.

When any one of the PWM frequency Fc and the upper and lower sidebands Fc+(n×Fm), Fc−(n×Fm) of the PWM frequency which are shown by the solid line in FIG. 7 overlaps with any one of the resonance frequency Fe and the harmonic frequency m×Fm which are shown by the dashed line, sound or electric resonance is generated.

When any one of the equation (1) to the equation (6) expressing these combination is established, sound or electric resonance is generated.

$$Fc=Fe \quad (1)$$

$$Fc=m\times Fm \quad (2)$$

$$Fc+(n\times Fm)=Fe \quad (3)$$

$$Fc+(n\times Fm)=n\times Fm \quad (4)$$

$$Fc-(n\times Fm)=Fe \quad (5)$$

$$Fc-(n\times Fm)=m\times Fm \quad (6)$$

When the equation (1) to the equation (6) are rearranged so that left side becomes Fc, and Fc is replaced to Fcav, the equation (7) to the equation (12) are obtained.

$$Fcav=Fe \quad (7)$$

$$Fcav=m\times Fm \quad (8)$$

$$Fcav=Fe-(n\times Fm) \quad (9)$$

$$Fcav=(m-n)\times Fm \quad (10)$$

$$Fcav=Fe+(n\times Fm) \quad (11)$$

$$Fcav=(m+n)\times Fm \quad (12)$$

Herein, Fcav expresses a PWM frequency required to be avoided (hereinafter, referred to as an avoidance frequency). Since sound or electric resonance is generated when the avoidance frequency Fcav calculated by each of the equation (7) to the equation (12) coincides with the actual PWM frequency Fc, the final PWM frequency Fc needs to be set while avoiding each avoidance frequency Fcav.

Figure 8:
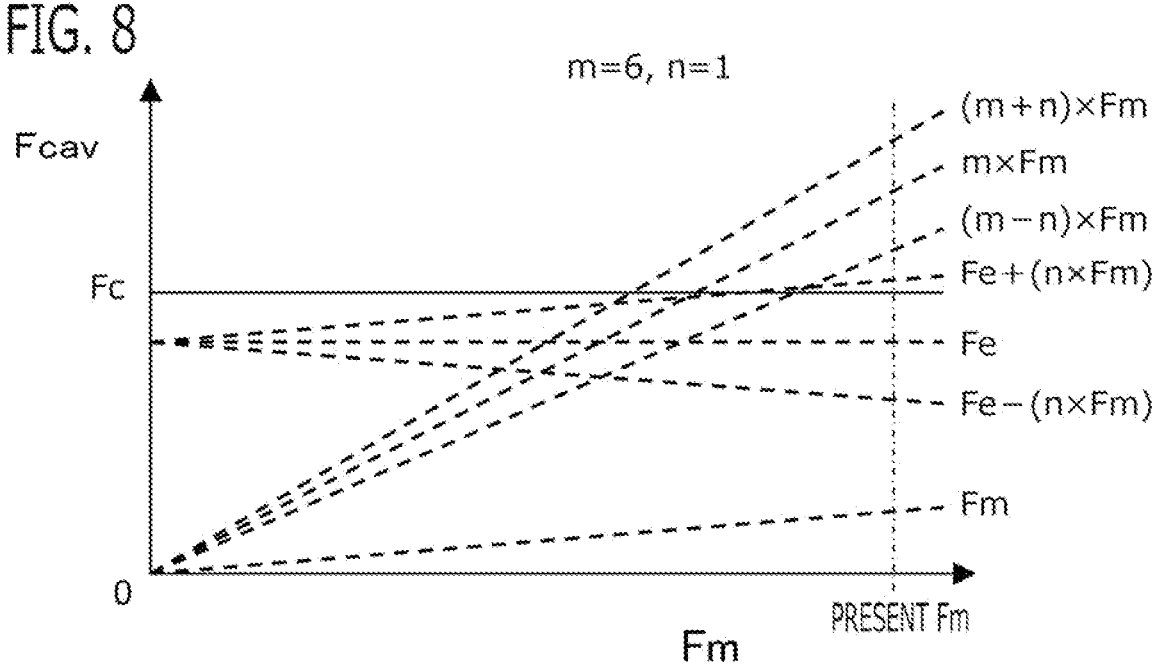
FIG. 8 is a figure explaining each avoidance frequency according to Embodiment 2.

In FIG. 8, the horizontal axis is set to the rotational frequency Fm, and the avoidance frequencies Fcav calculated by each of the equation (7) to the equation (12) are plotted in the vertical axis. As shown in FIG. 8, the PWM frequency Fc is changed so as not to overlap with the frequency band of each avoidance frequency Fcav at the present rotational frequency Fm.

<Setting of a Plurality of Avoidance Frequency Bands, and Avoidance Processing>

The frequency avoidance unit 352 uses, as the avoidance frequency band, a constant avoidance frequency band based on a constant frequency Fe as shown in the equation (7), a harmonic wave avoidance frequency band based on a harmonic frequency m×Fm proportional to the rotational frequency Fm as shown in the equation (8), a subtraction side avoidance frequency band based on a frequency Fe−(n×Fm) obtained by subtracting a side frequency n×Fm proportional to the rotational frequency Fm from the constant frequency Fe as shown in the equation (9), and an addition side avoidance frequency band based on a frequency Fe+(n×Fm) obtained by adding the side frequency n×Fm to the constant frequency Fe as shown in the equation (11).

As the harmonic wave avoidance frequency band, a frequency band based on a harmonic frequency (m−n)×Fm proportional to the rotational frequency Fm as shown in the equation (10), and a frequency band based on a harmonic frequency (m+n)×Fm proportional to the rotational frequency Fm as shown in the equation (12) are used.

According to this configuration, the PWM frequency Fc can be set so that the PWM frequency Fc, and the sidebands on the upper side the lower side of the PWM frequency Fc+(n×Fm), Fc−(n×Fm) do not overlap with the resonance frequency Fe and the harmonic frequency m×Fm; and the generation of sound or electric resonance can be suppressed.

In the present embodiment, the frequency avoidance unit 352 sets the avoidance frequency bands, based on the rotational frequency Fm of the AC rotary machine, as shown in the equation (8) to the equation (12). According to this configuration, corresponding to the sideband n×Fm or the harmonic frequency m×Fm which changes according to the rotational frequency Fm, the avoidance frequency band can be set appropriately.

As the avoidance frequency band, all of the constant avoidance frequency band, the harmonic wave avoidance frequency band, the subtraction side avoidance frequency band, and the addition side avoidance frequency band may not be used. The avoidance frequency band where degree of generation of sound or electric resonance is small may not be used as the avoidance frequency band; and any one or more of the constant avoidance frequency band, the harmonic wave avoidance frequency band, the subtraction side avoidance frequency band, and the addition side avoidance frequency bands may be used.

When the PWM frequency after change Fc is within the range of any one of the plurality of avoidance frequency bands, the frequency avoidance unit 352 changes the PWM frequency Fc to a side lower than the avoidance frequency band in which the PWM frequency after change Fc is within the range.

According to this configuration, even if the plurality of avoidance frequency bands are provided, since the PWM frequency Fc is changed to the side where the temperature of the inverter drops, the temperature of the inverter can be prevented from rising in order to avoid the plurality of avoidance frequency bands.

About the plurality of avoidance frequency bands, in order from the avoidance frequency band with higher frequency, the frequency avoidance unit 352 determines whether or not the PWM frequency after change Fc is within the range of the avoidance frequency band; and when the PWM frequency after change Fc is within the range, the frequency avoidance unit 352 changes the PWM frequency Fc to a side lower than the avoidance frequency band in which the PWM frequency after change Fc is within the range.

In the present embodiment, the frequency avoidance unit 352 calculates the six avoidance frequencies Fcav based on the present rotational frequency Fm using the equation (7) to the equation (12), and determines order of higher frequency about the six avoidance frequencies Fcav. Then, about the six avoidance frequencies Fcav, in order of higher frequency, the frequency avoidance unit 352 determines whether or not the PWM frequency after change Fc is within the range of the frequency band based on the avoidance frequency Fcav; and when the PWM frequency after change Fc is within the range, the frequency avoidance unit 352 changes the PWM frequency Fc to a side lower than the frequency band in which the PWM frequency after change Fc is within the range.

According to this configuration, since the avoidance processing is performed in order of higher frequency, even when the PWM frequency after change Fc is within the range of the lower avoidance frequency band by changing the PWM frequency Fc to a side lower than the avoidance frequency band, the avoidance processing is performed to the next lower avoidance frequency band. Therefore, the plurality of avoidance frequency bands can be avoided certainly, and the PWM frequency Fc can be changed to the low side.

<Flowchart>

Figure 9:
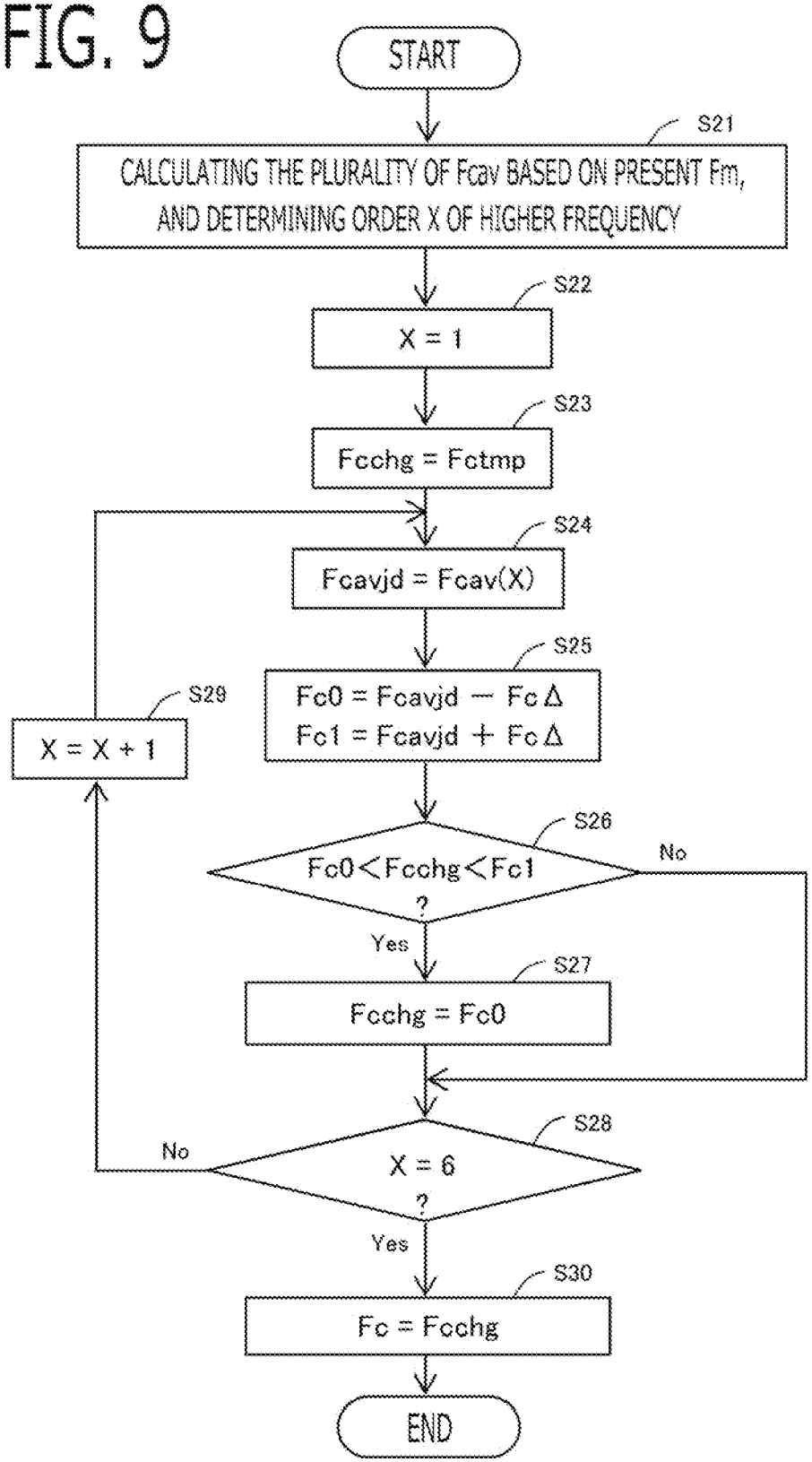
FIG. 9 is a flowchart explaining processing of the frequency avoidance unit according to Embodiment 2.

For example, the processing of the frequency avoidance unit 352 is realized by processing of the flowchart of FIG. 9. Processing of FIG. 9 is repeatedly performed at a predetermined calculation cycle.

In the step S21, the frequency avoidance unit 352 calculates the six avoidance frequencies Fcav based on the present rotational frequency Fm using the equation (7) to the equation (12), and determines order X of higher frequency about the six avoidance frequency Fcav. X=1 shows the order of the highest frequency; and whenever X increases one, it shows the order of next higher frequency (the order of one lower frequency).

At the present rotational frequency Fm shown in FIG. 8, it is determined as shown below.

For X=1, the calculated value of Fcav=(m+n)×Fm of the equation (12) is determined.

For X=2, the calculated value of Fcav=m×Fm of the equation (8) is determined.

For X=3, the calculated value of Fcav=(m−n)×Fm of the equation (10) is determined.

For X=4, the calculated value of Fcav=Fe+(n×Fm) of the equation (11) is determined.

For X=5, the calculated value of Fcav=Fe of the equation (7) is determined.

For X=6, the calculated value of Fcav=Fe−(n×Fm) of the equation (9) is determined.

Next, in the step S22, the frequency avoidance unit 352 set X=1 as the initial value. And, in the step S23, the frequency avoidance unit 352 sets the temporary PWM frequency Fcchg to the PWM frequency of temperature setting Fctmp as the initial value.

In the step S24, the frequency avoidance unit 352 sets the determination avoidance frequency Fcavjd to the calculated value of the avoidance frequency Fcav corresponding to the order X set at present. Then, in the step S25, the frequency avoidance unit 352 sets the lower end frequency Fc0 to a value obtained by subtracting the frequency bandwidth FcΔ from the determination avoidance frequency Fcavjd, and sets the upper end frequency Fc1 to a value obtained by adding the frequency bandwidth Fc0 to the determination avoidance frequency Fcavjd.

In the step S26, the frequency avoidance unit 352 determines whether or not the temporary PWM frequency Fcchg is within the range of the avoidance frequency band from the lower end frequency Fc0 to the upper end frequency Fc1, advances to the step S27 when it is within the range, and advances to the step S28 when it is outside the range. In the step S27, the frequency avoidance unit 352 sets the temporary PWM frequency Fcchg to the lower end frequency Fc0 of the avoidance frequency band.

In the step S28, the frequency avoidance unit 352 determines whether or not the order X is the final order of the lowest frequency (in this example, 6), advances to the step S30 when it is the final order, and advances to the step S29 when it is not the final order. In the step S29, after the frequency avoidance unit 352 increases the order X by one, it returns to the step S24 and performs the avoidance processing using the avoidance frequency Fcav of the next order X. On the other hand, in the step S30, the frequency avoidance unit 352 sets the final PWM frequency Fc to the temporary PWM frequency Fcchg, and ends processing.

3. Embodiment 3

Next, the AC rotary machine 5 and the controller 1 according to Embodiment 3 will be explained. The explanation for constituent parts the same as those in Embodiment 1 will be omitted. The basic configuration of the AC rotary machine 5 and the controller 1 according to the present embodiment is the same as that of Embodiment 1. However, Embodiment 3 is different from Embodiment 1 in the change processing of PWM frequency based on the temperature of the inverter.

The temperature frequency change unit 351 changes an adjustment coefficient K11, based on the detected temperature Tinv of the inverter, and sets the PWM frequency of temperature setting Fctmp to a value obtained by multiplying the adjustment coefficient K11 to the rotational frequency Fm of the AC rotary machine.

According to this configuration, by changing the adjustment coefficient K11 based on the temperature of the inverter, the PWM frequency Fc can be changed, and the PWM frequency Fc can be changed synchronizing with change of the rotational frequency Fm. Therefore, the synchronizing pulse width modulation which keeps constant the pulse number of turning on and off of the PWM control in the AC cycle of the three-phase voltage command values becomes possible.

Figure 10:
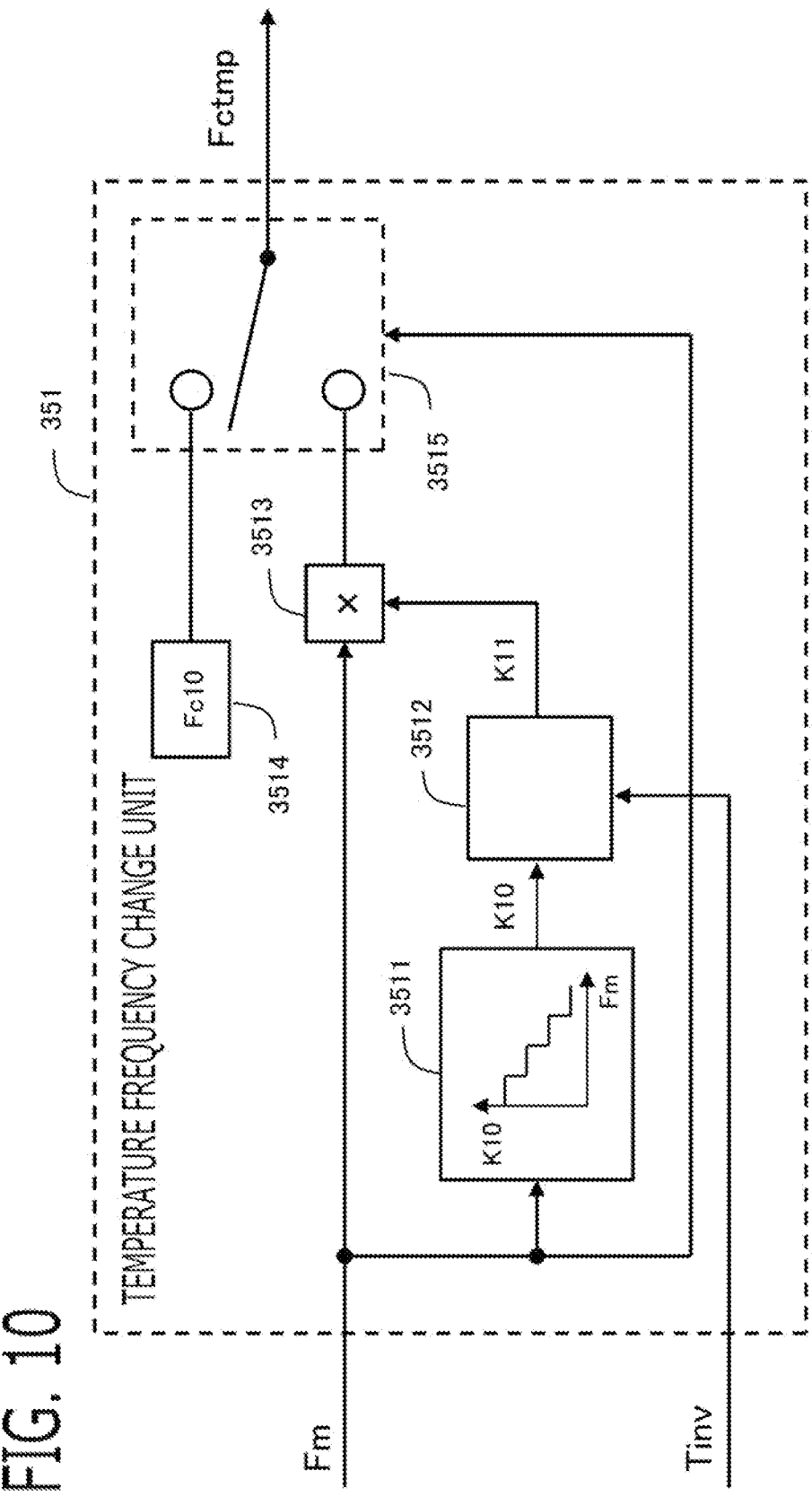
FIG. 10 is a block diagram of the temperature frequency change unit according to Embodiment 3.

In the present embodiment, as shown in FIG. 10, the temperature frequency change unit 351 is provided with a coefficient initial value setting unit 3511, an adjustment coefficient change unit 3512, a rotational frequency multiplication unit 3513, a low rotation frequency setting unit 3514, and a frequency switching unit 3515.

The coefficient initial value setting unit 3511 sets an initial value of adjustment coefficient K10, based on the rotational frequency Fm of the AC rotary machine. By referring to an initial value setting map in which a relationship between the rotational frequency Fm and the initial value K10 is preliminarily set, the coefficient initial value setting unit 3511 sets the initial value of adjustment coefficient K10 corresponding to the present rotational frequency Fm. As the rotational frequency Fm increases, the initial value K10 decreases so that the PWM frequency Fc does not become high too much.

The adjustment coefficient change unit 3512 sets the adjustment coefficient K11 by changing from the initial value of adjustment coefficient K10, based on the temperature Tinv of the inverter. For example, when the temperature Tinv of the inverter exceeds the temperature threshold Tinv0, the adjustment coefficient change unit 3512 decreases the coefficient change amount ΔK gradually. When the temperature Tinv of the inverter is less than the temperature threshold Tinv0, the adjustment coefficient change unit 3512 increases the coefficient change amount ΔK gradually. Then, the adjustment coefficient change unit 3512 sets the adjustment coefficient K11 to a value obtained by adding the coefficient change amount ΔK to the initial value of adjustment coefficient K10 (K11=K10+ΔK). For example, in the flowchart of FIG. 4 of Embodiment 1, this processing can be performed by replacing the PWM frequency of temperature setting Fctmp to the coefficient change amount ΔK, and replacing the upper limit frequency Fcmax and the lower limit frequency Fcmin to an upper limit coefficient change amount and a lower limit coefficient change amount.

The rotational frequency multiplication unit 3513 sets a normal PWM frequency of temperature setting Fctmp0 to a value obtained by multiplying the adjustment coefficient K11 to the rotational frequency Fm of the AC rotary machine. The low rotation frequency setting unit 3514 sets a PWM frequency Fc10 at a preliminarily set low rotation frequency. When the rotational frequency Fm of the AC rotary machine is lower than a determination frequency Fm0, the frequency switching unit 3515 sets the final PWM frequency of temperature setting Fctmp to the PWM frequency Fc10 at the low rotation frequency. When the rotational frequency Fm of the AC rotary machine is higher than the determination frequency Fm0, the frequency switching unit 3515 sets the final PWM frequency of temperature setting Fctmp to the normal PWM frequency of temperature setting Fctmp0.

According to this configuration, when the rotational frequency Fm of the AC rotary machine is higher than the determination frequency Fm0, the synchronizing pulse width modulation mentioned above is performed. On the other hand, when the rotational frequency Fm of the AC rotary machine is lower than the determination frequency Fm0, the PWM frequency Fc can be set to a fixed value regardless of change of the rotational frequency Fm, and the PWM frequency Fc can be prevented from becoming low too much. When the PWM frequency Fc is set to a fixed value, the asynchronous pulse width modulation in which the pulse number of turning on and off of the PWM control in the AC cycle of the three-phase voltage command values changes according to the rotational frequency Fm is performed.

4. Embodiment 4

Next, the AC rotary machine 5 and the controller 1 according to Embodiment 4 will be explained. The explanation for constituent parts the same as those in Embodiment 1 will be omitted. The basic configuration of the AC rotary machine 5 and the controller 1 according to the present embodiment is the same as that of Embodiment 1. Processing of the temperature frequency change unit 351 is constituted similar to Embodiment 3. Embodiment 4 is different from Embodiment 1 in that the adjustment coefficient K11 is used in the frequency avoidance unit 352.

Similar to Embodiment 3, the temperature frequency change unit 351 changes the adjustment coefficient K11, based on the detected temperature Tinv of the inverter, and sets the PWM frequency of temperature setting Fctmp to a value obtained by multiplying the adjustment coefficient K11 to the rotational frequency Fm of the AC rotary machine.

In the present embodiment, in addition to the PWM frequency of temperature setting Fctmp, the temperature frequency change unit 351 outputs the adjustment coefficient K11 and the execution information of the synchronizing pulse width modulation or the asynchronous pulse width modulation, to the frequency avoidance unit 352.

In the present embodiment, when the PWM frequency of temperature setting Fctmp is set by the adjustment coefficient K11 (the synchronizing pulse width modulation is performed) and the PWM frequency after change is within the range of the avoidance frequency band, the frequency avoidance unit 352 changes the adjustment coefficient K11 so that the PWM frequency Fc becomes outside the range of the avoidance frequency band, and sets the PWM frequency Fc to a value obtained by multiplying the adjustment coefficient K11 after change to the rotational frequency Fm of the AC rotary machine.

According to this configuration, since the avoidance frequency band is avoided by changing the adjustment coefficient K11, the synchronizing pulse width modulation can be performed even at avoiding.

On the other hand, when the PWM frequency of temperature setting Fctmp is set to the fixed value (when the asynchronous pulse width modulation is performed), as similar to Embodiment 1 or 2, the frequency avoidance unit 352 changes the PWM frequency out of the range of the avoidance frequency band, when the PWM frequency after change Fc is within the range of the avoidance frequency band.

<Flowchart>

Figure 11:
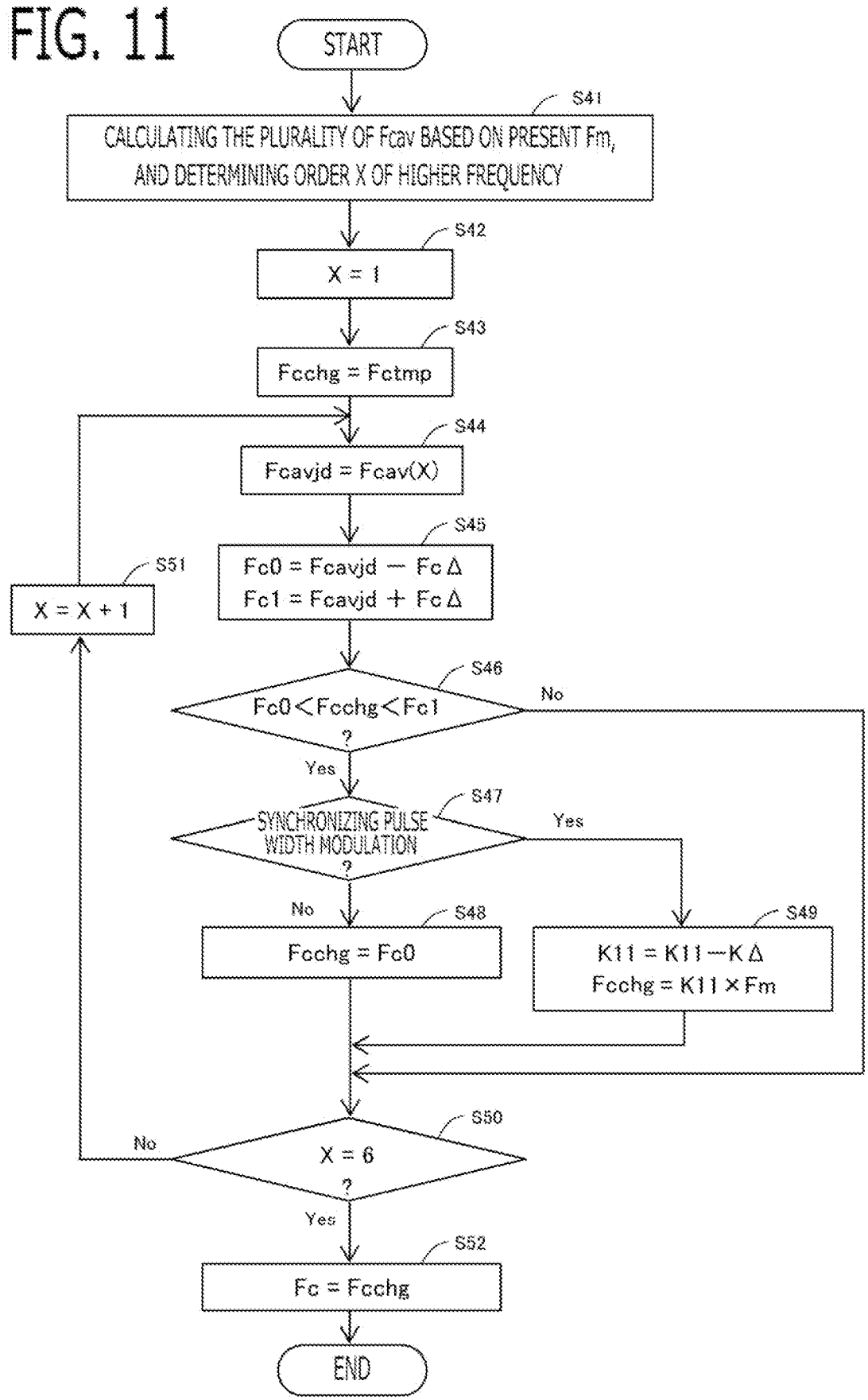
FIG. 11 is a flowchart explaining processing of the frequency avoidance unit according to Embodiment 4.

Similar to Embodiment 2, the case where the avoidance processing is performed about the plurality of avoidance frequency bands will be explained. For example, the processing of the frequency avoidance unit 352 is realized by processing of the flowchart of FIG. 11. Processing of FIG. 11 is repeatedly performed at a predetermined calculation cycle.

Similar to Embodiment 2, in the step S41, the frequency avoidance unit 352 calculates the six avoidance frequencies Fcav based on the present rotational frequency Fm using the equation (7) to the equation (12), and determines order X of higher frequency about the six avoidance frequency Fcav. X=1 shows the order of the highest frequency; and whenever X increases one, it shows the order of higher frequency (the order of one lower frequency).

Next, in the step S42, the frequency avoidance unit 352 set X=1 as the initial value. And, in the step S43, the frequency avoidance unit 352 sets the temporary PWM frequency Fcchg to the PWM frequency of temperature setting Fctmp as the initial value.

In the step S44, the frequency avoidance unit 352 sets the determination avoidance frequency Fcavjd to the calculated value of the avoidance frequency Fcav corresponding to the order X set at present. Then, in the step S45, the frequency avoidance unit 352 sets the lower end frequency Fc0 to a value obtained by subtracting the frequency bandwidth FcΔ from the determination avoidance frequency Fcavjd, and sets the upper end frequency Fc1 to a value obtained by adding the frequency bandwidth FcΔ to the determination avoidance frequency Fcavjd.

In the step S46, the frequency avoidance unit 352 determines whether or not the temporary PWM frequency Fcchg is within the range of the avoidance frequency band from the lower end frequency Fc0 to the upper end frequency Fc1, advances to the step S47 when it is within the range, and advances to the step S50 when it is outside the range.

In the step S47, the frequency avoidance unit 352 determines whether or not the synchronizing pulse width modulation is performed in the temperature frequency change unit 351, advances to the step S48 when the asynchronous pulse width modulation is performed, and advances to the step S49 when the synchronizing pulse width modulation is performed.

In the step S48, the frequency avoidance unit 352 sets the temporary PWM frequency Fcchg to the lower end frequency Fc0 of the avoidance frequency band. On the other hand, in the step S49, the frequency avoidance unit 352 decreases the adjustment coefficient K11 by the coefficient change width KΔ so that the PWM frequency Fc becomes smaller than the lower end frequency Fc0 of the avoidance frequency band (K11=K11−KΔ). The coefficient change width KA is set according to the rotational frequency Fm of the AC rotary machine. Then, the frequency avoidance unit 352 sets the temporary PWM frequency Fcchg to a value obtained by multiplying the rotational frequency Fm of the AC rotary machine to the adjustment coefficient K11 after change (Fcchg=K11×Fm).

In the step S50, the frequency avoidance unit 352 determines whether or not the order X is the final order of the lowest frequency (in this example, 6), advances to the step S52 when it is the final order, and advances to the step S51 when it is not the final order. In the step S51, after the frequency avoidance unit 352 increases the order X by one, it returns to the step S44 and performs the avoidance processing using the avoidance frequency Fcav of the next order X. On the other hand, in the step S52, the frequency avoidance unit 352 sets the final PWM frequency Fc to the temporary PWM frequency Fcchg, and ends processing.

5. Embodiment 5

Next, the AC rotary machine 5 and the controller 1 according to Embodiment 5 will be explained. The explanation for constituent parts the same as those in Embodiment 1 will be omitted. The basic configuration of the AC rotary machine 5 and the controller 1 according to the present embodiment is the same as that of Embodiment 1. Embodiment 5 is different from Embodiment 1 in that the application of AC rotary machine 5 is specified.

Figure 12:
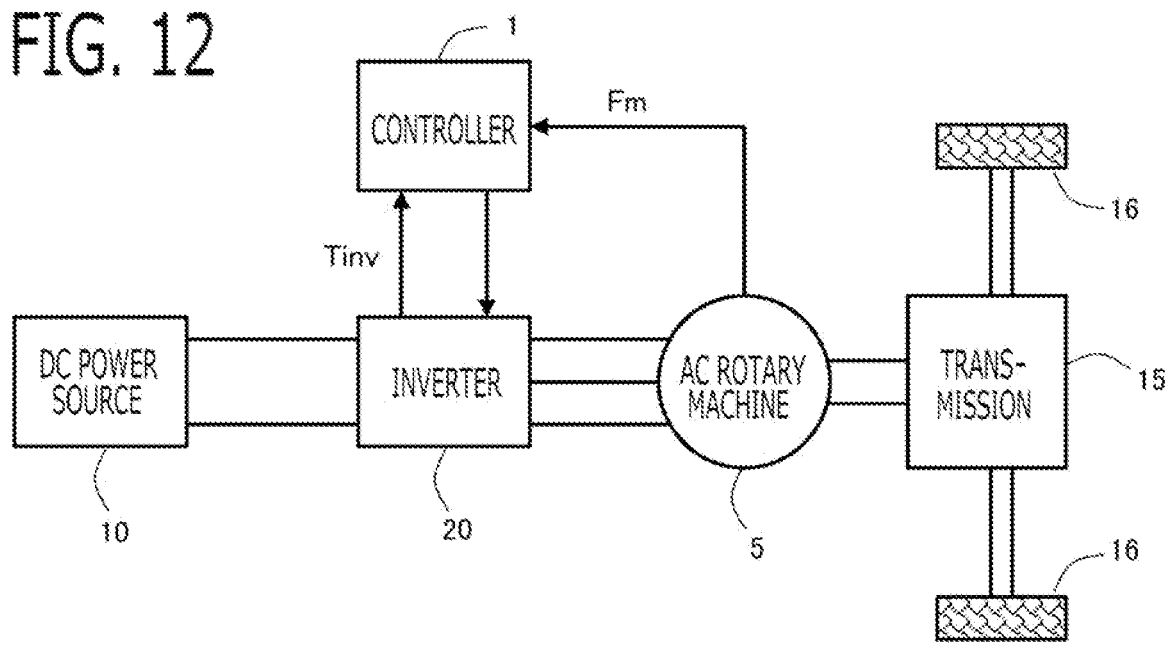
FIG. 12 is a schematic configuration diagram of the motor vehicle according to Embodiment 5.

As the schematic configuration diagram is shown in FIG. 12, in the present embodiment, the AC rotary machine 5 is used for the driving force source of the wheels 16 of the motor vehicle. The rotor of AC rotary machine 5 is mechanically connected to the wheels 16 via the transmission 15. The motor vehicle is provided with the controller 1 and the AC rotary machine 5. The motor vehicle may be the hybrid type motor vehicle which is provided with the internal combustion engine as the driving force source of the wheels in addition to the AC rotary machine 5.

Unlike the motor vehicle, in the AC rotary machine continuously operated at constant supply power, the inverter may be designed to solve the thermal problem on condition of that continuous operation. On the other hand, in the AC rotary machine for the motor vehicles like the present embodiment, the supply power of the AC rotary machine is largely different in the acceleration and deceleration of the motor vehicle, the constant speed traveling, and the stop state. Accordingly, if the inverter is designed to solve the thermal problem on the condition continuously operated at the maximum supply power, size, weight, and cost increase.

Like Embodiment 1 to 4, the controller 1 can suppress the temperature rise of the inverter by reducing the PWM frequency, when the temperature of the inverter rises. Therefore, size, weight, and cost can be reduced, while securing heat resistance.

Unlike the AC rotary machine used in the unmanned environment, the AC rotary machine for motor vehicles is premised on the manned environment, and it is necessary to suppress the uncomfortable sound. In the motor vehicle, in addition to the noise resulting from the structure of the AC rotary machine mentioned above, there is the mechanical resonance frequency of the power transmission passage which transmits the driving force of the AC rotary machine to the wheels. In the transmission 15, there is the noise called roar sound resulting from the minute error of tooth surface shape of the gear and the rigidity of tooth. This roar sound is a function of the number of teeth of the transmission 15, and the rotational frequency Fm, and the high roar sound becomes the high frequency of several kHz. These frequencies specific to the motor vehicle is also included in the avoidance frequency, and the avoidance processing is performed.

According to the controller 1 of the present embodiment, in addition to suppression of the noise of the AC rotary machine which becomes the function of the rotational frequency, the generation of the noise of the motor vehicle which becomes the function of the rotational frequency can be suppressed.

In the motor vehicle, since the DC harness which connects the inverter 20 and the DC power source 10 is restrained by the vehicle layout, it may be unable to keep the DC harness short. In this case, although the electric resonance frequency resulting from the circuit impedance comprising the inverter 20 and the DC power source 10 is also restrained by the vehicle layout, the generation of this electric resonance can be suppressed according to the controller 1 of the present embodiment.

In this way, according to the motor vehicle of the present embodiment, it is possible to solve the countermeasure against heat of the inverter 20 which supplies power to the AC rotary machine, and the problems of the motor vehicle such as the hearing feeling and the electric resonance, at the same time.

The AC rotary machine may be used for the driving force source of various kinds of apparatus other than the vehicle.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A controller for AC rotary machine that controls an AC rotary machine which is provided with n-phase windings (n is a natural number greater than or equal to two) via an inverter, the controller for AC rotary machine comprising at least one processor configured to implement:

a voltage command calculator that calculates n-phase voltage command values applied to the n-phase windings;

a PWM controller that turns on and off a plurality of switching devices which the inverter has at a PWM frequency, based on the n-phase voltage command values;

an inverter temperature detector that detects a temperature of the inverter; and a PWM frequency changer that changes the PWM frequency based on the detected temperature of the inverter, and changes the PWM frequency out of a range of an avoidance frequency band when the PWM frequency after change is within the range of the avoidance frequency band, wherein the PWM frequency changer sets the avoidance frequency band based on a rotational frequency of the AC rotary machine.

2. The controller for AC rotary machine according to claim 1, wherein the PWM frequency changer uses, as the avoidance frequency band, any one or more of a constant avoidance frequency band based on a constant frequency, a harmonic wave avoidance frequency band based on a harmonic frequency proportional to a rotational frequency of the AC rotary machine, a subtraction side avoidance frequency band based on a frequency obtained by subtracting a side frequency proportional to the rotational frequency of the AC rotary machine from the constant frequency, and an addition side avoidance frequency band based on a frequency obtained by adding the side frequency to the constant frequency.

3. The controller for AC rotary machine according to claim 1, wherein the PWM frequency changer uses, as the avoidance frequency band, a constant avoidance frequency band based on a constant frequency, a harmonic wave avoidance frequency band based on a harmonic frequency proportional to a rotational frequency of the AC rotary machine, a subtraction side avoidance frequency band based on a frequency obtained by subtracting a side frequency proportional to the rotational frequency of the AC rotary machine from the constant frequency, and an addition side avoidance frequency band based on a frequency obtained by adding the side frequency to the constant frequency.

4. A motor vehicle comprising:
the controller for AC rotary machine according to claim 1, and
the AC rotary machine used for a driving force source of vehicle wheels.

5. A controller for AC rotary machine that controls an AC rotary machine which is provided with n-phase windings (n is a natural number greater than or equal to two) via an inverter, the controller for AC rotary machine comprising at least one processor configured to implement:
a voltage command calculator that calculates n-phase voltage command values applied to the n-phase windings;
a PWM controller that turns on and off a plurality of switching devices which the inverter has at a PWM frequency, based on the n-phase voltage command values;
an inverter temperature detector that detects a temperature of the inverter; and
a PWM frequency changer that changes the PWM frequency based on the detected temperature of the inverter, and changes the PWM frequency out of a range of an avoidance frequency band when the PWM frequency after change is within the range of the avoidance frequency band, wherein the PWM frequency changer changes the PWM frequency to a side lower than the avoidance frequency band, when the PWM frequency after change is within the range of the avoidance frequency band.

6. The controller for AC rotary machine according to claim 5, wherein in a case where a plurality of the avoidance frequency bands are used as the avoidance frequency band, when the PWM frequency after change is within a range of any one of the plurality of avoidance frequency bands, the PWM frequency changer changes the PWM frequency to a side lower than the avoidance frequency band in which the PWM frequency after change is within the range.

7. The controller for AC rotary machine according to claim 5, wherein in a case where a plurality of the avoidance frequency bands are used as the avoidance frequency band, in order from the avoidance frequency band with higher frequency, the PWM frequency changer determines whether the PWM frequency after change is within the range of the avoidance frequency band, and when the PWM frequency after change is within the range, the PWM frequency changer changes the PWM frequency to a side lower than the avoidance frequency band in which the PWM frequency after change is within the range.

8. A controller for AC rotary machine that controls an AC rotary machine which is provided with n-phase windings (n is a natural number greater than or equal to two) via an inverter, the controller for AC rotary machine comprising at least one processor configured to implement:
a voltage command calculator that calculates n-phase voltage command values applied to the n-phase windings;
a PWM controller that turns on and off a plurality of switching devices which the inverter has at a PWM frequency, based on the n-phase voltage command values;
an inverter temperature detector that detects a temperature of the inverter; and
a PWM frequency changer that changes the PWM frequency based on the detected temperature of the inverter, and changes the PWM frequency out of a range of an avoidance frequency band when the PWM frequency after change is within the range of the avoidance frequency band, wherein the PWM frequency changer changes a PWM frequency of temperature setting, based on the detected temperature of the inverter;
when the PWM frequency of temperature setting is within the range of the avoidance frequency band, the PWM frequency changer sets the PWM frequency to outside the range of the avoidance frequency band; and
when the PWM frequency of temperature setting is outside the range of the avoidance frequency band, the PWM frequency changer sets the PWM frequency to the PWM frequency of temperature setting.

9. A controller for AC rotary machine that controls an AC rotary machine which is provided with n-phase windings (n is a natural number greater than or equal to two) via an inverter, the controller for AC rotary machine comprising at least one processor configured to implement:
a voltage command calculator that calculates n-phase voltage command values applied to the n-phase windings;
a PWM controller that turns on and off a plurality of switching devices which the inverter has at a PWM frequency, based on the n-phase voltage command values;
an inverter temperature detector that detects a temperature of the inverter; and
a PWM frequency changer that changes the PWM frequency based on the detected temperature of the inverter, and changes the PWM frequency out of a range of an avoidance frequency band when the PWM frequency after change is within the range of the avoidance frequency band, wherein the PWM frequency changer changes an adjustment coefficient, based on the temperature of the inverter, and set the PWM frequency before avoidance processing of the avoidance frequency band, to a value obtained by multiplying the adjustment coefficient to the rotational frequency of the AC rotary machine.

10. The controller for AC rotary machine according to claim 9, wherein when the PWM frequency after change is within the range of the avoidance frequency band, the PWM frequency changer changes the adjustment coefficient so that the PWM frequency is outside the range of the avoidance frequency band, and sets the PWM frequency to a value obtained by multiplying the adjustment coefficient to the rotational frequency of the AC rotary machine.

* * * * *